(12) United States Patent
Miller

(10) Patent No.: US 6,760,475 B1
(45) Date of Patent: Jul. 6, 2004

(54) COLORIMETRIC IMAGING SYSTEM

(75) Inventor: Peter J. Miller, Newburyport, MA (US)

(73) Assignee: Cambridge Research & Instrumentation Inc., Boston, MA (US)

( * ) Notice: Subject to any disclaimer, the term of this patent is extended or adjusted under 35 U.S.C. 154(b) by 663 days.

(21) Appl. No.: 09/687,621

(22) Filed: Oct. 13, 2000

Related U.S. Application Data

(60) Provisional application No. 60/159,277, filed on Oct. 13, 1999.

(51) Int. Cl.$^7$ .............................. G06K 9/00; G06K 9/40; G02B 27/00
(52) U.S. Cl. ...................... 382/162; 382/260; 359/578
(58) Field of Search .............................. 359/285, 239, 359/250, 254, 260, 386, 578, 579; 382/162, 260, 165, 261, 262, 274, 305; 356/73, 139.1, 330, 346

(56) References Cited

U.S. PATENT DOCUMENTS

| | | | |
|---|---|---|---|
| 3,003,388 A | | 10/1961 | Hunter et al. |
| 4,115,006 A | * | 9/1978 | Reymond et al. ......... 356/139.1 |
| 4,467,438 A | | 8/1984 | Zerlaut et al. |
| 4,508,964 A | | 4/1985 | Gunning, III et al. |
| 5,142,414 A | | 8/1992 | Koehler ...................... 359/578 |
| 5,151,751 A | | 9/1992 | Nakajima et al. |
| 5,432,609 A | | 7/1995 | Sugiyama et al. |
| 5,596,436 A | * | 1/1997 | Sargis et al. ................... 398/76 |
| 5,784,152 A | * | 7/1998 | Heffelfinger et al. .......... 356/73 |
| 5,841,577 A | * | 11/1998 | Wachman et al. ........... 359/386 |
| 5,892,612 A | * | 4/1999 | Miller et al. ................. 359/250 |
| RE36,529 E | * | 1/2000 | Lewis et al. ................. 356/346 |
| 6,046,808 A | * | 4/2000 | Fateley ........................ 356/330 |
| 6,101,014 A | * | 8/2000 | Majima ........................ 398/69 |
| 6,490,075 B1 | * | 12/2002 | Scheps et al. ............... 359/285 |

OTHER PUBLICATIONS

International Search Report, issued on Jan. 16, 2001 in International stage application PCT/US00/28465, which application corresponds to the present application.
PCT Written Opinion, issued on Sep. 13, 2001 in International stage application PCT/US00/28465, which application corresponds to the present application.
Reply to Written Opinion, filed on Nov. 13, 2001 in response to PCT Written Opinion which issued on Sep. 13, 2001 in International stage application PCT/US00/28465, which application corresponds to the present application.
International Preliminary Examination Report, issued on Feb. 15, 2002, in International stage application PCT/US00/28465, which application corresponds to the present application.

* cited by examiner

Primary Examiner—Andrew W. Johns
Assistant Examiner—Amir Alavi
(74) Attorney, Agent, or Firm—Cohen, Pontani, Lieberman & Pavane

(57) ABSTRACT

The present invention provides for an imaging system that obtains, as well as a method for obtaining, the colorimetric value of a plurality of points in a scene when the scene is lit by a source of illumination. The system comprises an imaging detector, imaging optics that receive light from the scene and direct it to the detector, a tunable filter responsive to applied electrical signals that filters the spectrum of light passing therethrough, and a control circuit for acquiring and storing a plurality of images from the detector while the tunable filter expresses a plurality of predetermined filter response functions in response to applied electrical signals, and for determining the colorimetric values from the stored images, wherein each of the filter response functions has substantial transmission at a plurality of wavelengths.

18 Claims, 16 Drawing Sheets

COLORIMETRIC IMAGING SYSTEM

RELATED APPLICATIONS

This application claims priority from U.S. Provisional Patent Application Serial No. 60/159,277 which was filed on Oct. 13, 1999.

BACKGROUND OF THE INVENTION

1. Field of the Invention

The invention pertains to electronic color image acquisition, as well as digital image storage, retrieval and transmission.

2. Description of the Related Art

Digital images are normally captured in RGB color space, meaning that each pixel or point in the image is characterized by three values indicating the amount of red, green, and blue light present at that point. Typically, the filters used (either in a mosaic or in a sequential color system) partition the light energy into three bands according to wavelength, so the shortest wavelengths are recorded as blue, the middle range as green, and the longest range as red. Typically the blue range is 400–490 nm, green is 490–580 nm, and red is 590–660 nm. Then, the overall signal levels of red, green, and blue are adjusted to achieve a white balance. Often, color-correction matrix is applied to increase color separation, normally in the form of a non-diagonal 3×3 matrix that is multiplied by the raw [R, G, B] data for each pixel (expressed as a column vector), to produce the improved [R, G, B] output data for that pixel.

There are problems with this approach. First, the definition of the three primaries is not universal amongst all manufacturers and all types of equipment. Second, and more fundamental, the color basis used to acquire images is not colorimetric in nature. This means it is possible to have two objects in a scene which appear to have a different visual hue or brightness from one another, yet an RGB camera would record the objects as having the same RGB reading. Conversely, one can have two objects which present the same visual appearance to the eye, yet which would be recorded as having different RGB color values.

The reason for this problem is that the color response of the camera weights different wavelengths of light differently from how the human eye does. As a result, the 'redness' of an object recorded by the camera is not equivalent to the redness perceived by the eye, and similarly for other hues.

There is no way to retrieve the actual color from the digital image, once it has been captured in non-colorimetric terms. The loss of color information occurs at the time the image is recorded, due to the difference between the camera's color weighting and the human eye's color perception. No cameras or scanners in the prior art record the colors using the same color response that the human eye affords. As a result, color fidelity of digital images is lost at the time the image is captured.

The color error can be quantified for a given camera using measures such as the difference in L*a*b units between the color as recorded, and the true color of the object. A recent paper determined the relative spectral response of a Kodak DCS-200 and DCS420 camera, from which the color error may be determined for objects with various color spectra. In some cases, errors up to 20 L*a*b units are found, where 1 color unit represents the limit of human perceptibility.

Another problem occurs when one seeks to transform between an RGB color representation of a scene and other color representations such as cyan-yellow-magenta-black (CMYK) that is used in printing. This can lead to further degradation of color fidelity. Part of the reason for this is that the primaries in the other color representation space may not be well defined, i.e. the standard yellow, cyan, and magenta are not agreed-on. If there were agreement on this topic one might expect it would be possible to transform between various color representations by means of a simple 3×3 linear algebraic matrix without color fidelity loss, using techniques known in the art of color science. However, the use of a transformation matrix presumes that the original color representation weighted the various color components in the same fashion that the human eye does, or in some linear algebraic transform of this fashion. Since the RGB color image is ambiguous in the sense that the camera or scanner used to record it has a color response that is not the same as the color perception response of the eye, the color error in the original color space can be increased when transforming to another color space.

Another problem relates to the fact that the color error of different cameras is not the same, and further depends on the hues being captured. If the transformation matrix is optimized for a certain range of colors or wavelengths, other colors will not be transformed well. Similarly, a transformation that works adequately for one camera (with its attendant color error properties) may not work well for another camera, which has a different set of color errors. This has led to a profusion of ad hoc methods to 'calibrate' various cameras and scanners, as are evident in software packages such as Apple's Color Sync, Agfa's FotoTune.

There is a well-established field of colorimetry, described in standard texts such as MacAdam, Color Measurement, or Hunter and Harold, Measurement of Visual Appearance. It encompasses the specification of color, the human perception of hues and intensity, and the visual appearance of objects. However, there is at present no equipment or technique for the photographic or digital photographic recording of images in colorimetric terms. That is, while it is recognized that the principles of colorimetry should be applicable to every point in an image, the prior art equipment for measuring the colorimetric properties of light only records a single point at a time, or at most a line at a time. It would be possible, by adding scanning means and taking a sequence of line or point readings, to assemble a complete image with such equipment, but it is not practical except in a research laboratory environment. No practical system exists for recording an entire image in colorimetric terms, rapidly and with high spatial resolution.

Related to this, there are various measurement tools, including calorimeters, spectrometers, and the like, which are used to check the color of printed materials, and the appearance of luminous displays such as cathode-ray tubes (CRTs). Some of these devices are placed near or in contact with a CRT display, and its color is read by computer while various color signals are put to it. In this way, the color distortions and other properties of the display are learned and that information is used by color management software to correct for deficiencies in the display. Similar technology exists for printers, LCD displays and other graphic output devices. However, there is no quantitative basis for insuring end-to-end color management unless both the acquisition and display alike are put on a quantitative basis and given high fidelity. The present practice may be termed an open-loop approach, with control over only a portion of the process.

CRI (Boston, Mass.) makes a tunable filter termed the 'VariSPEC' which enables one to acquire an image at any specified wavelength. By using this filter to take many images that span the visible spectrum, multiplying the pixel intensity values of each image by the numerical value of the X colorimetric weighting function, and summing the reading of all images at each pixel, one can obtain the exact colorimetric value for the X response at each point in the image. The weighting and summing may then be repeated to obtain the Y and Z colorimetric values, at which point one has a high-resolution image of the scene with colorimetric color rendering.

Gemex (Mequon, Wis.) has made and marketed a gem-grading system which uses this approach to quantify the color of valuable gems, and to produce colorimetric-quality images. However, many exposures are required, typically 20 or more, from which the spectral data is extracted. The amount of data required the computing burden, and the time involved—approximately one minute per complete image—render this impractical for most uses.

Koehler, in U.S. Pat. No. 5,142,414 teaches a micro-mechanical etalon which purports to produce an electrically-variable optical transmission or reflection response. By altering the drive signal to an array of micro-mechanical actuators, one varies the spacing between members of an etalon, or places them essentially in contact. This is said to provide means for producing transmission functions that mimic the XYZ colorimetric weighting functions. However, the mechanism by which this is achieved is not clear, since the X, Y, and Z curves have quite different finesse from one another, and the X value is doubly-peaked within a given order. If such a system were constructed, it is believed the colorimetric matching would be of a poor quality.

There is at present no practical system of digital photography that preserves the colors accurately and with high fidelity. Nor does the present art provide for specifying the colors in digital photography in a way which can be objectively measured, and compared against standards at any point from acquisition through reproduction and printing. Thus despite the electronic photography revolution, the field of printing and reprographics remains an artisan trade, and customers of printing and graphic design cannot be sure that objects will be recorded and reproduced as they want. The increasing reliance on the Internet for commerce has led to a greater desire for true color in order that color decisions can be made with confidence when shopping.

SUMMARY OF THE INVENTION

It is the aim of this invention to provide a method and means for digital recording of a scene in colorimetric terms with comparable ease and speed to other methods of digital photography. It is another aim of this invention to obtain such images in XYZ space, L*a*b space and other colorimetric spaces that make efficient use of computer storage and digital transmission bandwidth.

One embodiment uses liquid crystal filters in a time-sequential approach to color imaging. The liquid crystal filters produce transmission curves that match the X,Y, and Z response functions divided by the spectral response of the electronic image detector. Thus, the overall system captures the X,Y, and Z components of every point in the scene in a digital photographic image. A variation of this further incorporates means to record the color properties of the ambient light.

Another embodiment of special use in medical imaging uses a spectrally-variable illuminator to illuminate the scene, which is then photographed at three illuminator settings. The illuminator settings are chosen to be the spectrum of a desired illuminant, times the X, Y, and Z response, divided by the spectral response of the detector. Thus, the overall system captures the X, Y, and Z components of the scene in a digital photographic image taken under controlled illumination conditions such as daylight or CIE C, CIE A, or the like.

These produce images that directly and quantitatively capture the color in colorimetric units at every point in the scene. The preferred embodiment further incorporates means for converting the raw images into XYZ space, taking account of overall signal levels and the relative exposure times employed. In some embodiments, there is included a further means for transforming from XYZ colorimetric space to an L*a*b space, which has the property that equal distances correspond to equal perceptual differences, so digital storage of the pixel appearance is efficient and compact for storage and transmission purposes.

This invention enables one to obtain images with greatly reduced color errors, or simply put, to take digital photographs with markedly better color quality. This will be an immediate benefit to digital photography users. Some embodiments incorporate means for transforming the image from XYZ colorimetric space to RGB space in a quantitative fashion that permits transformation back to XYZ or other colorimetric spaces without loss or degradation of color information.

A key long-term benefit of the Invention is that, since it records images in a quantitative fashion, it is possible at all subsequent steps to refer to the primary colorimetric data and know what colors were present. So, while a given monitor, printer, or display may have inherent color limitations and errors which prevent the perfect rendering of the image, one may utilize this Invention to preserve a true record of the colors as they ought to be present in the image. Presently, since a camera's errors are comparable to those of any other component, it is normal practice that the color balance is altered by eye at each step: acquisition, layout, proofing, color separation, and printing. The resulting accumulation of errors, and the absence of any quantitative objective basis for end-to-end color checking, is eliminated by the present invention. It may be employed (in one or more embodiments) both to acquire the image and to confirm that it has been accurately reproduced. In both cases, the operation is accurate, quantitative and colorimetric—it responds in the same fashion as the human eye. Thus, end-to-end color management is realized.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
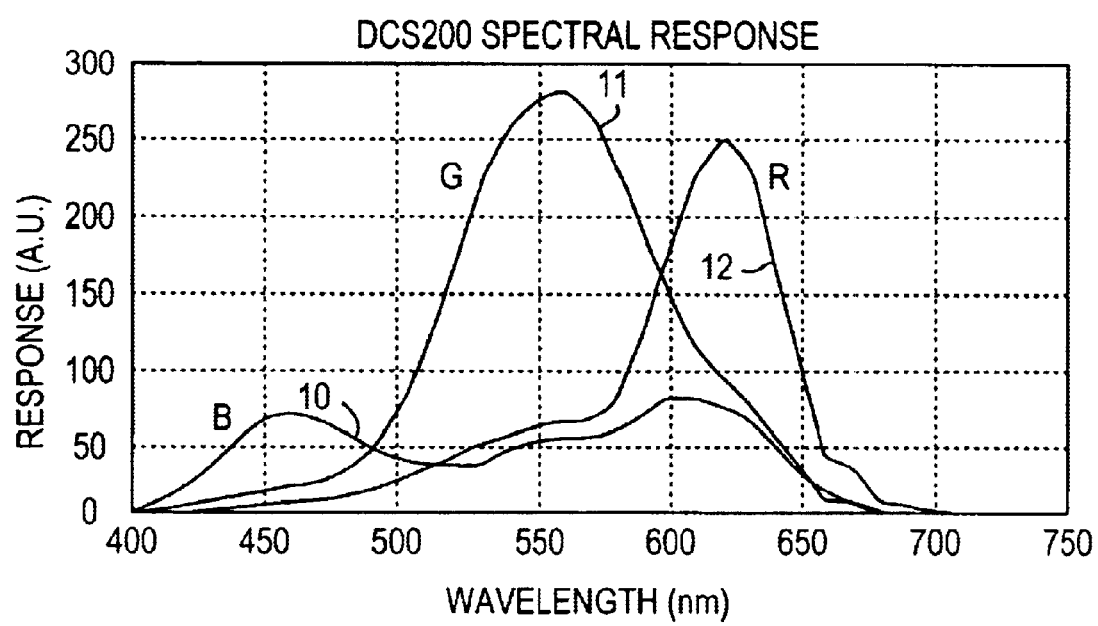
FIG. 1 shows the spectral response of a prior-art Kodak DCS200 digital color camera. The response of the red, green, and blue channels are indicated by R, G, and B.

The embodiments shown make use of a detector with a certain spectral response, and an illumination system or a filtration system which accommodates this spectral response and further imposes either the X, the Y, or the Z colorimetric weighting function. That is, the filter or illumination system has a spectral response given by:

$$F_x(\lambda) = k_x X(\lambda)/D(\lambda) \quad [1a]$$

$$F_y(\lambda) = k_y Y(\lambda)/D(\lambda) \quad [1b]$$

$$F_z(\lambda) = k_z Z(\lambda)/D(\lambda) \quad [1c]$$

Where:
$K_i$ are scalar constants
$F_i(\lambda)$ is the relative spectral content of the filter or spectral illuminator at wavelength $\lambda$
$D(\lambda)$ is the spectral responsivity of the detector In this way, the system takes three exposures which comprise the X, Y, and Z content of the scene presented to the camera, with overall signal levels multiplied by arbitrary scale factors. It is necessary to calibrate the scale factors $k_i$, and to take into account the relative exposure time used for each image, in order to ascribe a quantitative value of X, Y, and Z to each point in the image. If desired, it is further possible to utilize information about the lens setting and overall exposure times to determine the absolute intensity level, but this is often not a goal and may be omitted in most cases.

The spectral response of the X, Y, and Z weighting function is relatively smooth and free of high-frequency spectral features, which simplifies the construction of a filter or illuminator which realizes the desired responses as listed in Equations 1a–1c. However, many CCD and CMOS detectors incorporate thin-film structures such as polysilicon gates and the like, which exhibit interference phenomena and high-frequency spectral features. This can be seen in looking at the Kodak KAF-1400 detector, for example, shown in FIG. 2b. The exact location of the spectral peaks and valleys is not reproducible from device to device, as the thickness of the structures is not controlled to a sufficient degree, and in any case off-axis rays will experience a blue-shifting of the spectral features as is well-known for interference phenomena. Thus, while it is possible to construct a colorimetric camera using such a detector, it will exhibit somewhat degraded color accuracy relative to the preferred embodiments described below. However, the prevalence and low cost of detectors with this construction makes their use a practical compromise in many cases.

In contrast, other types of detectors are better-suited for precise colorimetric imagery. First, thinned back-illuminated CCD detectors have no significant thin-film effects, and consequently little detailed spectral structure. Also, their sensitivity is quite high, which further recommends them for imaging; however, at present the cost of thinned back-illuminated devices is prohibitive for all uses except high-end scientific and industrial imaging. Absent these, another suitable alternative is to use an interline detector such as the Sony KX-085, which incorporates a microlens array. The chip is arranged so that a portion of each pixel is free of thin-film structures, and incident light is focused by the microlens array onto that portion of the pixel. This drastically reduces spectral fine-structure, and increases the sensitivity in the blue portion of the spectrum, where polysilicon is relatively absorptive. Further, the interline configuration has a slow roll-off in the infrared, relative to non-interline devices. This is often beneficial, since the goal in a colorimetric system is to reproduce the visual response functions, in which case the camera must be rendered insensitive to the infrared band. That can be a demanding requirement when working with a detector that has little blue response, but significant infrared response, such as the KAF-1400. Infrared blocking is thus simplified when working with an interline detector like the interline KX-085.

Another example with intermediate qualities is the Kodak KAF-1400E. This detector is similar to the KAF-1400 CCD, except the polysilicon layers are replaced with indium-tin oxide (ITO), which is much more transparent in the blue spectral range, and which has a lower refractive index (RI) that leads to significantly reduced interference effects compared to polysilicon-based devices.

Since acquiring an image requires three exposures (one in each spectral response setting), it is important to achieve a high detector read-out rate. This keeps the overall time short, minimizing image smear and color breakup. Accordingly, CMOS detectors with high-speed digitization, active-pixel architectures, and the like, offer benefits over slower CCD detectors. Combination of a CMOS approach with a microlens array enables achieving the goals of high read-out rate and smoothly varying, high sensitivity.

Figure 2A:
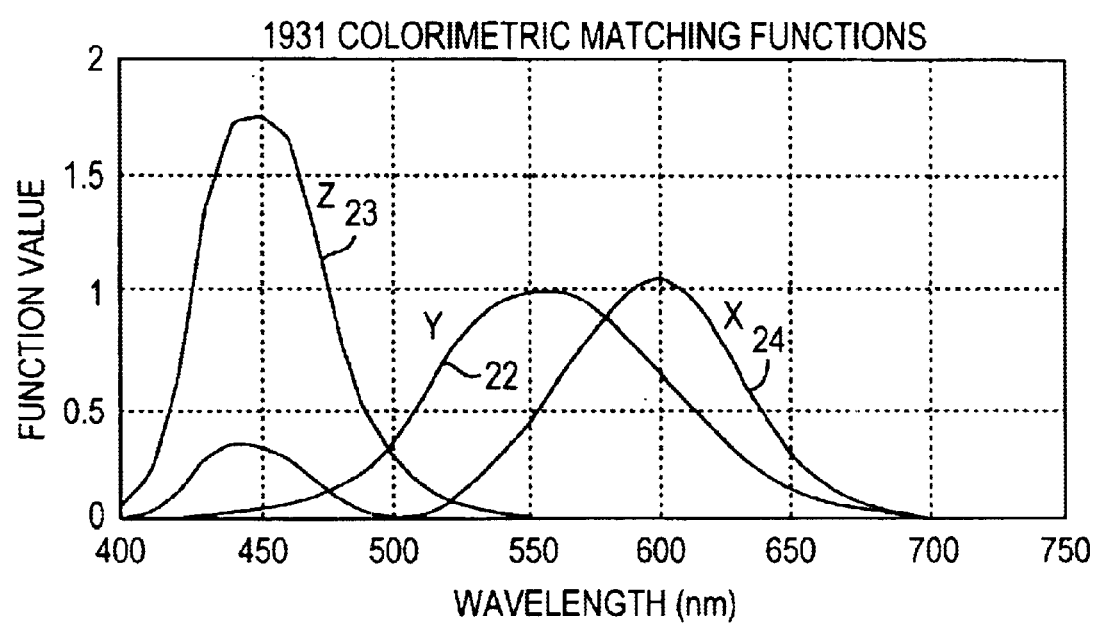
FIG. 2a shows the spectral response of the X, Y, and Z colorimetric functions as specified by the 1931 CIE for a 2° field-of-view.
Figure 2B:
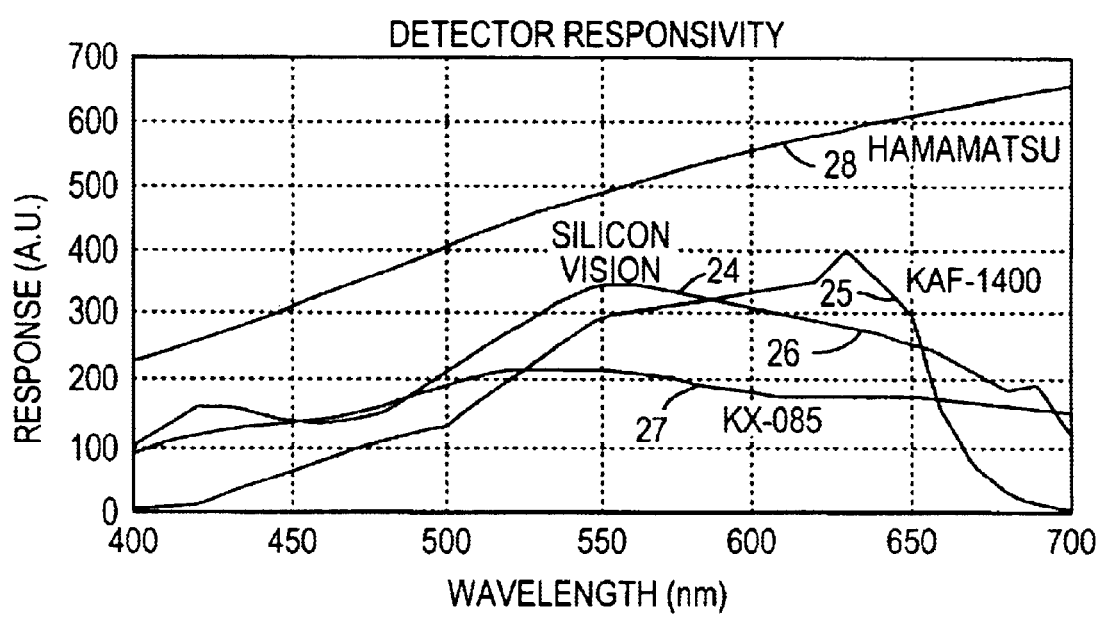
FIG. 2b shows the spectral response for several imaging detectors including a KX-085 (Sony, Tokyo), a back-illuminated Hamamatsu CCD (Bridgewater, N.J.), and an amorphous silicon detector from Silicon Vision (Siegen, Germany).

Another example of a detector which is especially useful in this regard is the CAESER chip manufactured by Silicon Vision GmbH (www.siliconvision.com). This is a CMOS detector with on-chip capability to take three exposures in rapid succession (<1 ms overall), storing photocurrent from all three exposures on-chip until digitization and read-out. The CAESER has an integral amorphous silicon photodiode array deposited on top of the read-out circuitry, and the photodiode array has a bias voltage which may be modulated to alter the spectral response between exposures, if desired. While this is not essential to practice the present Invention, it can be beneficial in e.g. reducing NIR sensitivity when taking the Z($\lambda$) exposure. This firm also produces an amorphous silicon photodiode array which is operated at a fixed bias voltage, whose response is shown in FIG. 2b.

Figure 3:
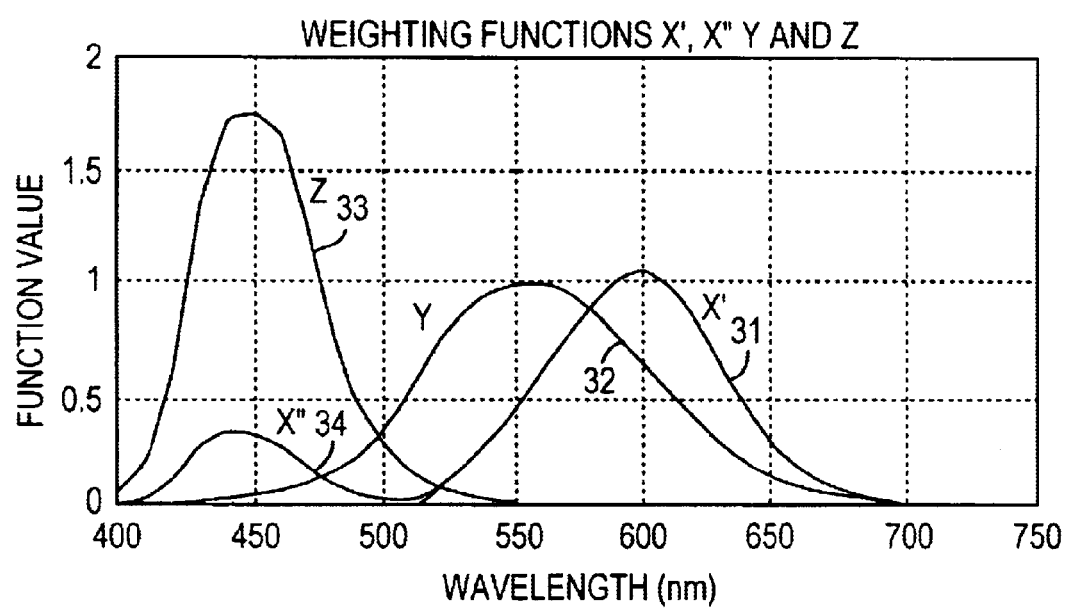
FIG. 3 shows the spectral response of the weighting functions X', X", Y, and Z as described in this patent application.

It is sometimes preferable to use a related set of equations to achieve colorimetric imaging. These curves are shown in FIG. 3 as X', X", Y, and Z. These take advantage of the fact that the blue spectral feature in the X colorimetric curve has nearly the same spectral shape as the Z colorimetric curve, which leads us to define a new function X' which is defined equal to the CIE weighting function X for all wavelengths greater than 510 nm, and zero at all shorter wavelengths. It is often much easier to construct a filter or illuminator which realizes this response, and responses derived from it, than it is to construct one that realizes the true X response. Yet from the X' response and the Z response, one can derive a good approximation to the X response as:

$$X''(\lambda)=X'(\lambda)+\alpha Z(\lambda) \quad [2]$$

Using $\alpha$=0.17, the difference function DF($\lambda$)=X($\lambda$)-X"($\lambda$) is rendered quite small. Its largest magnitude is for a monochromatic source at 430 nm (DF=+0.049) or 490 nm (DF=-0.049). When taking images, one measures the integral of X"($\lambda$) over all visible wavelengths, which further reduces the error since DF is chosen to have an integral of zero for typical illuminants. Thus, measurements of a gray object under CIE C illumination made using X"($\lambda$) agree with those using X($\lambda$) within 0.02%, which is immeasurably small. Even for highly saturated yellow or blue test targets, measurements using X" and X agree within one percent. As this illustrates, X" is usually a sufficiently accurate match to the target function X.

Figure 4:
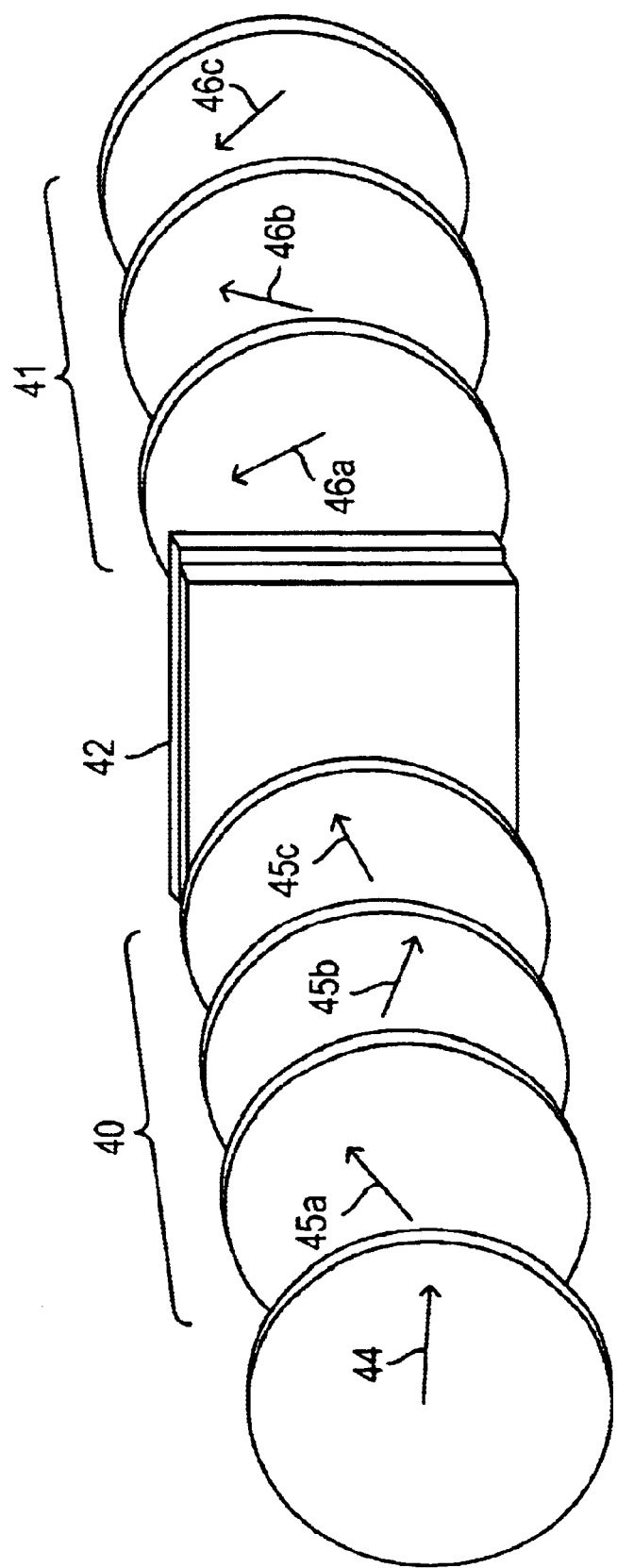
FIG. 4 shows the construction of a liquid crystal switchable filter element as described in U.S. Pat. No. 5,892,612 entitled "Tunable Optical Filter with White State".

One preferred embodiment consists of a liquid crystal tunable filter (LCTF), a digital camera, and software. The LCTF can be constructed utilizing the design described in U.S. Pat. No. 5,892,612, "Tunable Optical Filter with White State". A diagram of a filter stage of this type is shown in FIG. 4. The filter has three such stages, each of which has two color states. One state is designed to match the response of a given colorimetric function (such as X', Y, or Z), and the other state is a clear state which is highly transmissive at all visible wavelengths. In practice, the transmission will not be unity in the clear state, especially for the Y state at wavelengths near the blue or red end of the spectrum. This must be taken into account when designing the other filter states, so an overall desired transmission is achieved.

Each stage comprises an entrance polarizer, a first network of retarders, a liquid crystal variable retarder, and a second, symmetrically related network of retarders. The entrance polarizer of a given stage forms the analyzer polarizer for the previous stage, and there is one additional polarizer at the end of the assembly that comprises an exit polarizer for the third stage. Finally, there is a passive color filter incorporated, which comprises a piece of BG-39 filter glass.

The liquid crystal cells exhibit a half-wave retardance in the relaxed state, and approximately zero retardance in the driven state. All retarders in a given network have the same value of retardance, and produce a nominally white state when the liquid crystal cell interposed between the two networks exhibits a half-wave retardance. One such arrangement is achieved by choosing the angles of the second retarder network as:

$$\theta_2(i)=\pi/2-\theta_1(K+1-i) \quad [3]$$

where $\theta_2(i)$ is the orientation angle of the slow axis of the i-th retarder in the second network, $\theta_1(K+1-i)$ is the orientation angle of the slow axis of the K+1-i th element in the first network, and each of the two networks has N elements. The angles $\theta_1(i)$ are chosen to achieve a desired spectral filtration state when the liquid crystal cell exhibits approximately zero retardance. The theory and design of such networks is described in detail in the aforementioned U.S. Pat. No. 5,892,612.

The filter design can be tabulated in terms of the angle and retardation value of the retarder films employed, and the thickness and nominal half-wave retardance of the liquid crystal cell, for each stage. All retardation films are NRZ type, made by Nitto Denko and sold by Nitto Denko America. It is also possible to construct the multiple layer elements using photopolymer methods as described by Chiulli et. al. All liquid crystal cells are pi-cells, using construction methods that are known in the art and further recited in U.S. Pat. No. 5,892,612. Use of thin substrates is favored, to minimize overall optical path length. All polarizers are NPF-1225DU type, made by Nitto Denko, and have their transmission axis oriented at an angle of 0°. A passive color-glass filter of BG-39 is incorporated as well, and its thickness is tabulated as well.

It is possible to omit the inner two polarizers, as those stages which are not producing a spectral filtration have nominally no effect on the polarization state of light.

However, this is not achieved perfectly in practice, so the optical performance may be improved by including all four polarizers, at the cost of a slight loss in transmission efficiency. A compromise is to use a lightly-dyed polarizer such as Sanritz LL-5616 or the like, for the inner polarizers, whose only function is to clean up the slight component of depolarized light introduced by nominally inactive stages.

The filter design can be performed in several ways. One approach is to take the desired filter functions $F_x(\lambda)$, $F_y(\lambda)$, and $F_z(\lambda)$ from equations [1a]–[1c], and further divide them by the spectral transmission of all other elements in the filters, such as the BG-39 color shaping glass, the polarizers and any other components. These are then fitted as a Fourier series expansion in terms of $\cos(m\lambda)$ for various m. Typically between two and four terms are sufficient to produce a good fit for colorimetric imaging purposes. The Fourier expansion of a given function yields a set of coefficients $a_i$ that may be used as the input to the synthesis procedure recounted in the aforementioned patent "Tunable optical filter with white state". From the synthesis, one obtains the retarder orientation angles. The retarder is chosen to have integral order at peak wavelength of the filter function, which is not generally the same as the peak of the colorimetric matching functions X, Y, and Z, due to the spectral response of the detector and filter components.

It is also possible to use designs taught by Solc in "Birefringent Chain Filter" and termed 'fan' filters, having an even number of retarders 2N. The liquid crystal switch element inserted between elements N and N+1, with its fast axis parallel or perpendicular to the polarization state of light incident upon the filter. Both apodized and non-apodized designs may be used, but apodized are preferred because their shape more nearly matches that of the desired filter functions. The use of a Solc filter design is normally more apt for the Z filter than for X' or Y for the cases shown in this Application, due to the shape of the tristimulus functions and the detector responses involved. However, the decision to use a Solc design or a generalized design based on expansion in terms of $\cos(m\lambda)$ will be made based upon the particulars of the detector involved in a given case, and the allowable color error.

Figure 5:
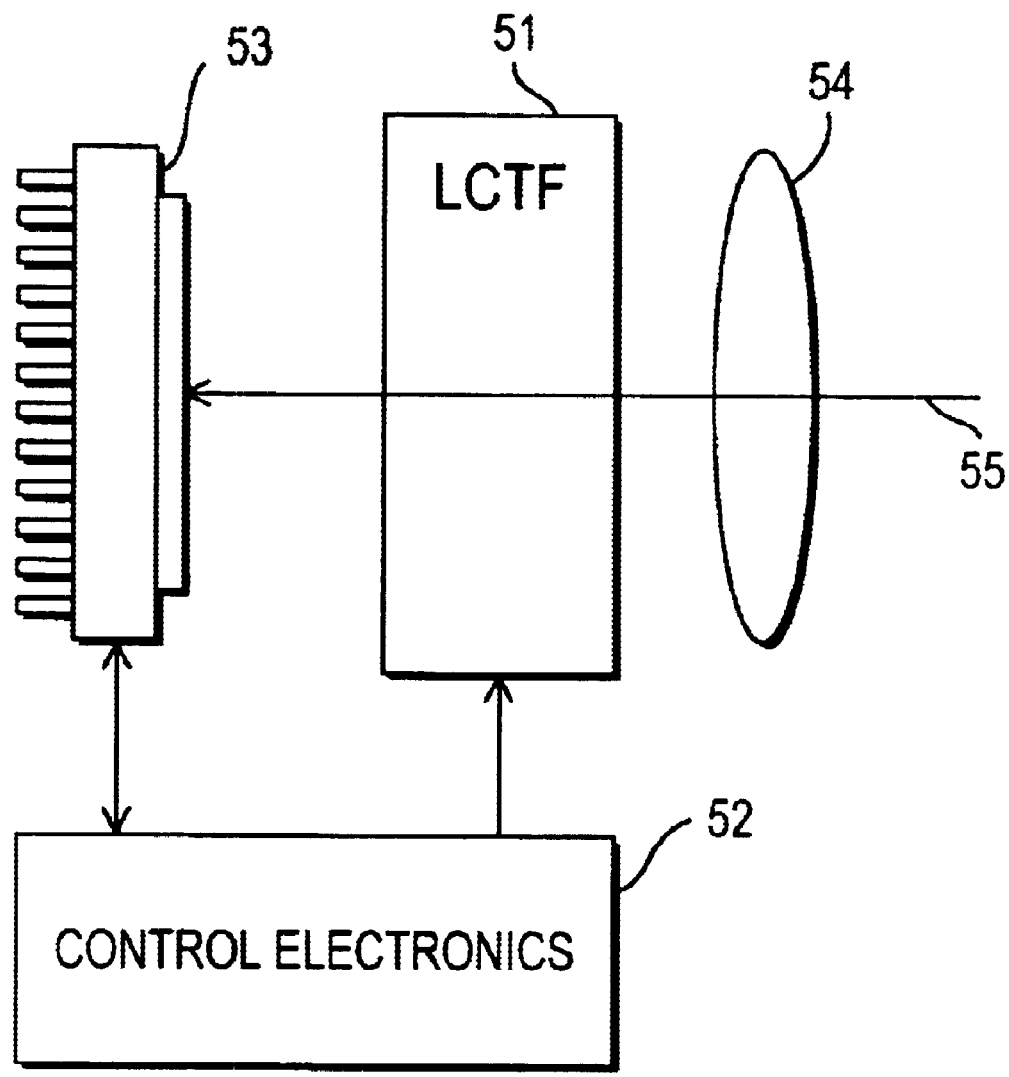
FIG. 5 shows a colorimetric imaging system in accordance with the present invention, comprising a liquid crystal filter, a detector, and control electronics.

FIG. 5 shows a colorimetric imaging system in accordance with the present invention, consisting of a liquid crystal switchable filter, a detector, and control electronics.

Figure 6:
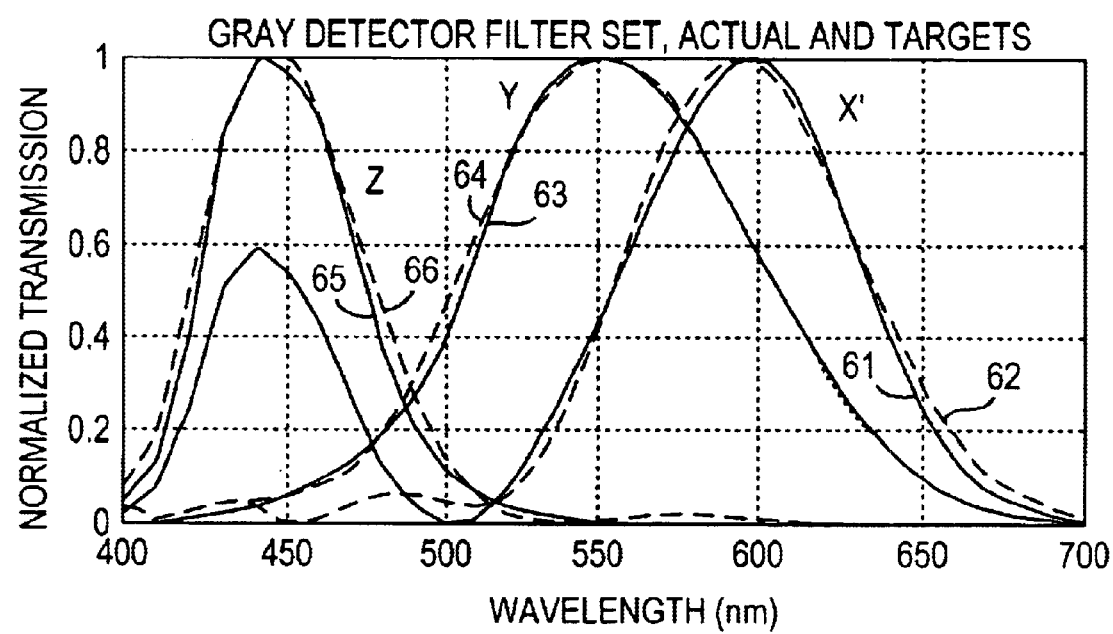
FIG. 6 shows the transmission of a three-element liquid crystal filter in the clear state and in three filtering states designed to match the colorimetric curves for X', Y, and Z.

Table 1 shows the design for a filter that realizes the filter response curves of FIG. 6. These are a good quantitative match to the colorimetric functions X', Y, and Z, and the filter may be used with a spectrally-neutral detector to directly image a scene in colorimetric terms. An example of such a detector is the ferroelectric array camera developed by Texas Instruments, to which a thin surface of gold-black has been deposited as described in Foukal. This detector is spectrally neutral to within 2 percent across the visible and near-infrared. This system, where the filter directly produces the CIE colorimetric curves and the detector is spectrally neutral, is easily modeled and its performance directly confirmed.

TABLE 1

Filter set for spectrally neutral detector

|  | X' stage | Y stage | Z stage |
|---|---|---|---|
| Retardance | 625 nm | 560 nm | 440 nm |
| No. of Retarders | 4 | 4 | 4 |
| $\theta_{R1}$ | 82.6° | 84.2° | 79.4° |

TABLE 1-continued

Filter set for spectrally neutral detector

|  | X' stage | Y stage | Z stage |
|---|---|---|---|
| $\theta_{R2}$ | 60.7° | 62.5° | 58.4° |
| $\theta_{1c}$ | 0° | 0° | 0° |
| $\theta_{R3}$ | 29.3° | 27.5° | 31.6° |
| $\theta_{R4}$ | 7.4° | 5.8° | 10.6° |
| LC $\lambda_{1/2}$ | 495 nm | 520 nm | 595 nm |
| Color-shaping glass: | 0.85 mm of BG-39 Schott color glass | | |

Figure 7:
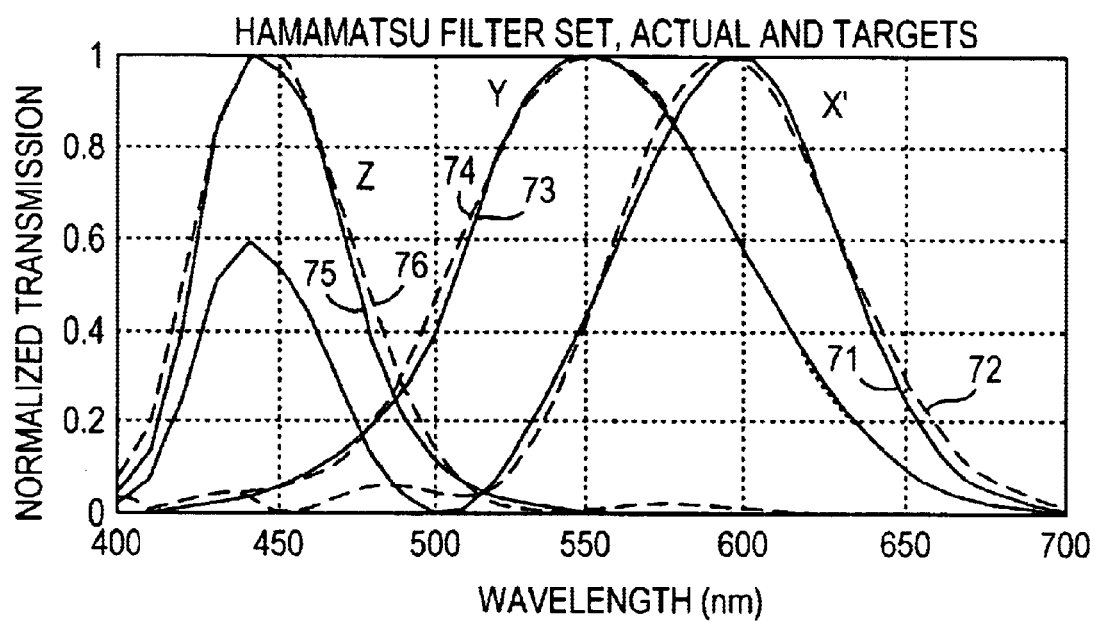
FIG. 7 shows the transmission of a three-element liquid crystal filter in three filtering states designed to have 'spectra that match the X',Y, and Z curves divided by the response curve of a back-illuminated Hamamatsu CCD. The filter curves are shown as solid lines, and the desired response is shown as dashed lines.

However, most detectors do not have spectrally neutral response, as discussed earlier, and therefore the filter set must realize a related set of responses given by equations 1a–1c. A second filter design is tabulated in Table 2, which achieves these criteria for the Hamamatsu thinned back-illuminated detector. The SPH-5 camera from Apogee Instruments (Tucson, Ariz.) uses this detector. The response of the second filter is shown in FIG. 7, superimposed on the desired curves given by 1a–1c for this detector. As it shows, the deviation from ideal colorimetric response is quite small.

TABLE 2

Filter set for Hamamatsu back-illuminated detector

|  | X' stage | Y stage | Z stage |
|---|---|---|---|
| Retardance | 620 nm | 555 nm | 437 nm |
| No. of Retarders | 4 | 4 | 4 |
| $\theta_{R1}$ | 81.4° | 83.0° | 79.4° |
| $\theta_{R2}$ | 60.0° | 62.1° | 58.4° |
| $\theta_{1c}$ | 0° | 0° | 0° |
| $\theta_{R3}$ | 30.0° | 27.9° | 31.6° |
| $\theta_{R4}$ | 8.6° | 7.0° | 10.6° |
| LC $\lambda_{1/2}$ | 495 nm | 520 nm | 595 nm |
| Color-shaping glass: | 0.75 mm of BG-39 Schott color glass | | |

Figure 8:
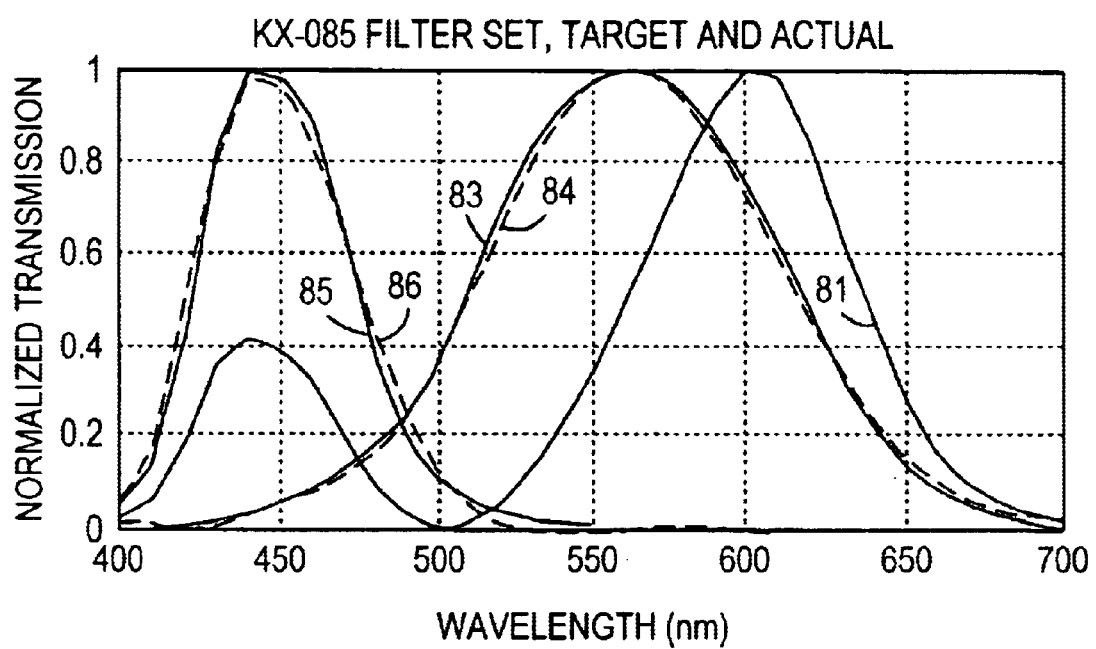
FIG. 8 shows the transmission of a three-element liquid crystal filter in three filtering states designed to have spectra that match the X', Y, and Z curves divided by the response curve of a Sony KX-085 detector.
Figure 9:
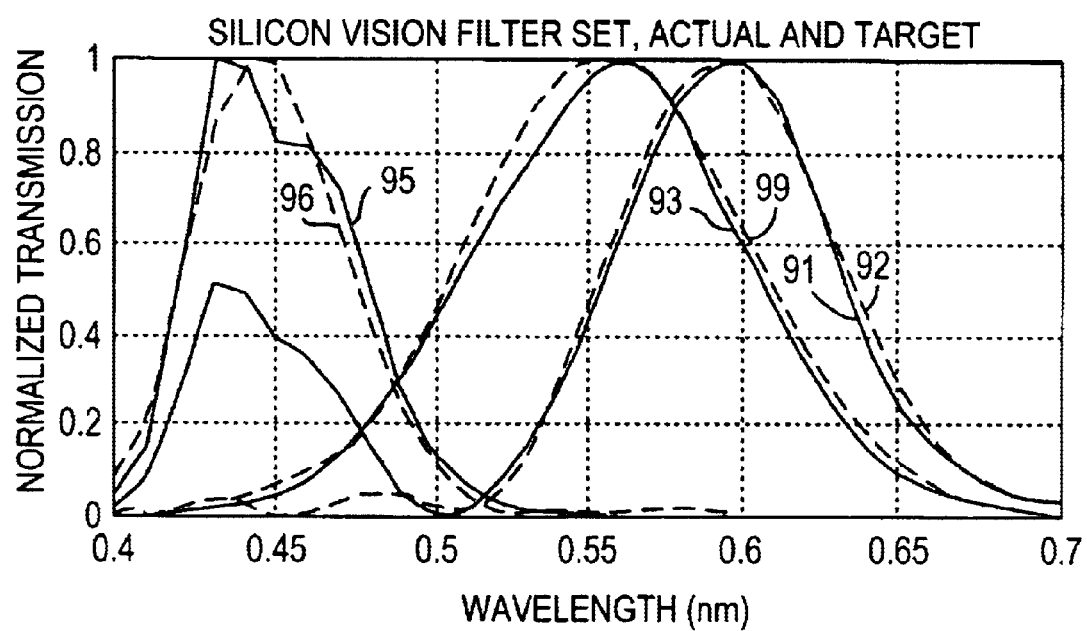
FIG. 9 shows the transmission of a three-element liquid crystal filter in three filtering states designed to have spectra that match the X', Y, and Z curves divided by the response curve of an amorphous silicon detector produced by Silicon Vision.

A third filter design- is tabulated in Table 3 which matches the response of equations 1a–1c for the Sony KX-085 interline detector. Cameras that incorporates this detector include the Apogee KX-085, the Cooke SensiCam (Tonawanda, N.Y.), and the Hamamatsu Orca (Bridgewater, N.J.). The response of this third filter is shown in FIG. 8, superimposed on the desired curves for this detector. Again, near-ideal colorimetric response is attained.

TABLE 3

Filter set for Sony KX-085 interline detector

|  | X' stage | Y stage | Z stage |
|---|---|---|---|
| Retardance | 625 nm | 570 nm | 437 nm |
| No. of Retarders | 4 | 4 | 4 |
| $\theta_{R1}$ | 80.5° | 84.0° | 79.4° |
| $\theta_{R2}$ | 59.4° | 63.1° | 58.4° |
| $\theta_{1c}$ | 0° | 0° | 0° |
| $\theta_{R3}$ | 30.6° | 26.9° | 31.6° |
| $\theta_{R4}$ | 9.5° | 6.0° | 10.6° |
| LC $\lambda_{1/2}$ | 495 nm | 520 nm | 595 nm |
| Color-shaping glass: | 0.7 mm of BG-39 Schott color glass | | |

Finally, Table 4 shows the design of a filter for use with the Silicon Vision detector, when operated at fixed bias—i.e. with no modulation of detector spectral response via bias voltage. The response of this filter is shown superimposed upon the desired response curves, and again the match is excellent.

TABLE 4

Filter set for Silicon Vision amorphous silicon detector

|  | X' stage | Y stage | Z stage |
| --- | --- | --- | --- |
| Retardance | 615 nm | 560 nm | 437 nm |
| No. of Retarders | 4 | 4 | 4 |
| $\theta_{R1}$ | 81.0° | 84.6° | 79.4° |
| $\theta_{R2}$ | 59.8° | 63.2° | 58.4° |
| $\theta_{1c}$ | 0° | 0° | 0° |
| $\theta_{R3}$ | 30.2° | 26.8° | 31.6° |
| $\theta_{R4}$ | 9.0° | 5.4° | 10.6° |
| LC $\lambda_{1/2}$ | 495 nm | 520 nm | 595 nm |
| Color-shaping glass: | 0.75 mm of BG-39 Schott color glass | | |

It is often beneficial to incorporate a passive filter such as BG-39 color glass, for two reasons. First, it makes it easier to synthesize a filter that matches the X' response, due to the particular shapes of the X' response and of the passive filter response. Second, it achieves a strong blocking of the infrared region, which is vital if one is to avoid contamination of the colorimetric image by infrared signals. Other filter materials may also be used instead of BG-39 glass to achieve purposes such as improved spectral quality, lower cost, thinner overall filter construction, and the like. Dyed or coated plastic films may be preferred for reasons such as reduced cost and weight. Such decisions will be made according to well-known arts of optical design and engineering.

The best image quality is usually obtained when the liquid crystal filter is located in a portion of the optical path where the rays are telecentric (or nearly so), as that arrangement insures there is no variation of incidence angle through the filter, versus position in the image. This achieves the most consistent color across the image, free of color shading. However, this is not always possible, as many photographic systems use lenses that are not telecentric. In that case, it is best to minimize the field-of-view requirement on the filter, by placing it in that portion of the optical path where there is least angular spread. Another consideration is that of aperture, which must be kept low for reasons of economy. Finally, it is preferable to locate the filter away from image planes, as a defect or blemish at or near an image plane will result in an artifact in the image. This effect is well-known in the art of optical system design, as are techniques for evaluating what distance is suitable for a given f/number and defect size. All the above factors will be considered in the optical design, as is well known in the art.

The system is operated as follows. The liquid crystal filter is tuned to a first state, such as the state corresponding to the X' response, and an image is obtained from the digital camera. Then the liquid crystal filter is tuned to a second state, say the state corresponding to the Y response, and a second image is obtained. Finally, the filter is tuned to the final state, corresponding to the Z response, and a third image is obtained from the digital camera. The exposure times are recorded as $t_x$, $t_y$, and $t_z$.

These exposures may be taken in rapid sequence to minimize blur and color break-up, which can result from motion of the object being photographed, although for still life compositions there is no such requirement. The system made by Silicon Vision GmbH is suitable for high-speed acquisition, as it has storage means on-chip that record the signal level for X', Y, and Z exposures, which may be subsequently read out. While the CAESAR detector has a means to adjust its spectral response for each exposure, this is not essential for the present invention, which could be achieved using a variant of the CAESAR which maintains the same spectral response for all exposures. Other detectors which provide for multiple, rapid exposures would be suitable as well.

Figure 10:
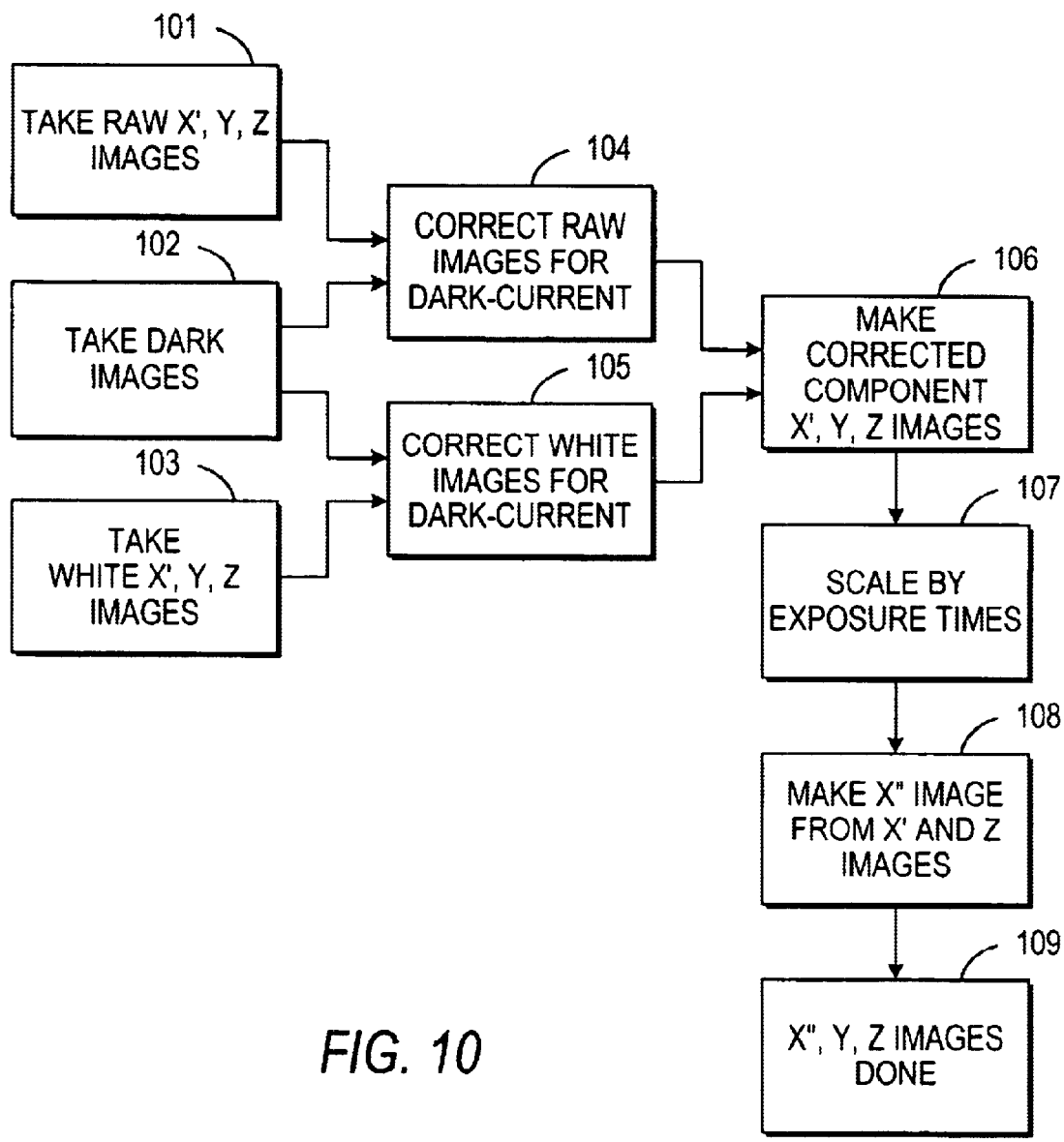
FIG. 10 shows a block diagram of the steps involved in obtaining an XYZ colorimetric image using the present invention.

The image processing sequence is shown in FIG. 10. Each raw image is corrected for dark-current as is known in the art. The dark-corrected images may be further corrected for spatial variation in brightness at different pixels (a so-called 'flat-field' correction). This correction typically uses a 'white' image of a uniformly bright target. Such an image may be obtained through opal glass (Edmund Scientific, Barrington, N.J.) if a uniformly bright target is not available. The flat-field correction may be omitted completely if the pixel-to-pixel variation, also sometimes called fixed-pattern noise, is acceptably small and the liquid crystal filter is situated in a telecentric beam or the range of angles is small enough that its transmission is sufficiently alike for all points in the image. The flat-field correction is usually performed separately for each image (X', Y, and Z), using a 'white' image taken while the filter is in the corresponding filter state, since typically the off-axis intensity does not vary in like fashion for the different filter states.

The resulting images, termed corrected component images, are used to derive the colorimetric image. The steps involve scaling by the exposure time, and by the factors $k_x$, $k_y$, and $k_z$. The latter may be determined by a one-time calibration where a white halon target is illuminated by a known illuminant such as CIE A or CIE C, and imaged by the system. The k factors may then be determined by means such as e.g. regression against the measured readings in the corrected component images. In mass production, the unit-to-unit variation may be small enough that such calibration is only performed on a sample device, or at intervals during production, and used for all cameras in a lot.

At this point, the X" function is reconstructed from the X' and Z functions, if such an arrangement is used. Finally, the three scaled images are combined to form a colorimetric image.

Figure 11:
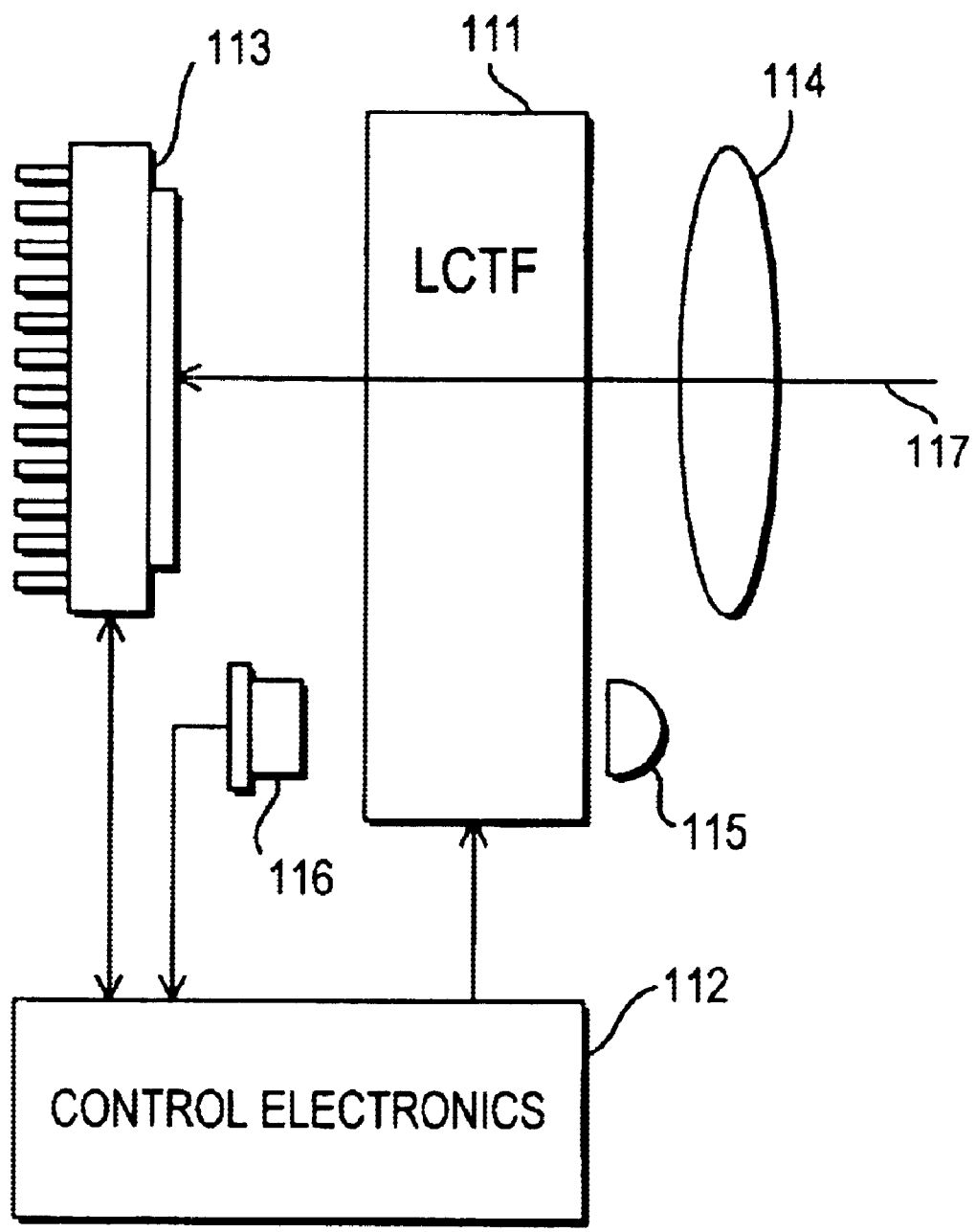
FIG. 11 shows a block diagram of a colorimetric imaging system in accordance with the present invention, further incorporating means for sensing the colorimetric value of the ambient light.

It is further possible to incorporate means for sensing the colorimetric qualities of the ambient illumination, as shown in FIG. 11. A representative beam is obtained by use of a diffusing element which may be planar or hemispherical, and this is directed through the filter element to a photodetector. The photodetector may be a small region of the same detector used to record the image, or it may be another detector such as a single-pixel photodiode which has a comparable spectral response to that of the image detector. From the readings of the ambient-light color detector one derives the X, Y, and Z (or Z") properties of the illuminant. Other arrangements which perform this goal would be equally acceptable for this purpose.

Figure 12:
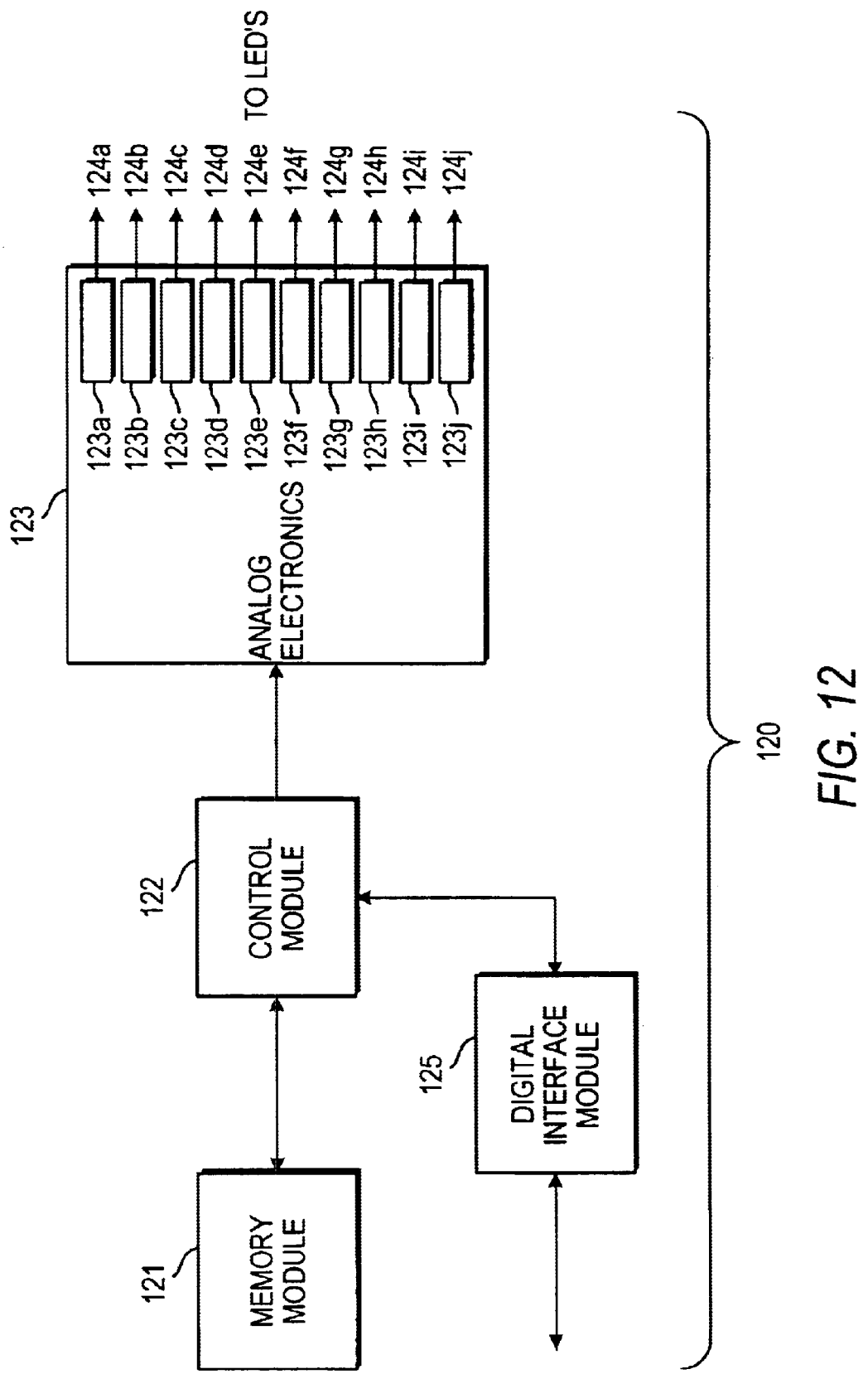
FIG. 12 shows the block diagram of a spectral illuminator which is described in the copending application "Spectral Imaging System", Serial No. 60/147,636, the entire contents of which are hereby incorporated into this application.

A second class of preferred embodiment is based on selective illumination using spectrally variable illuminators. These devices are discussed in a co-pending application, "Spectral Imaging System", U.S. Serial No. 60/147,636, the contents of which are hereby incorporated into this application. A diagram is shown of one such illuminator, in FIG. 12. It provides for rapid computer control of the illumination spectrum.

Figure 13:
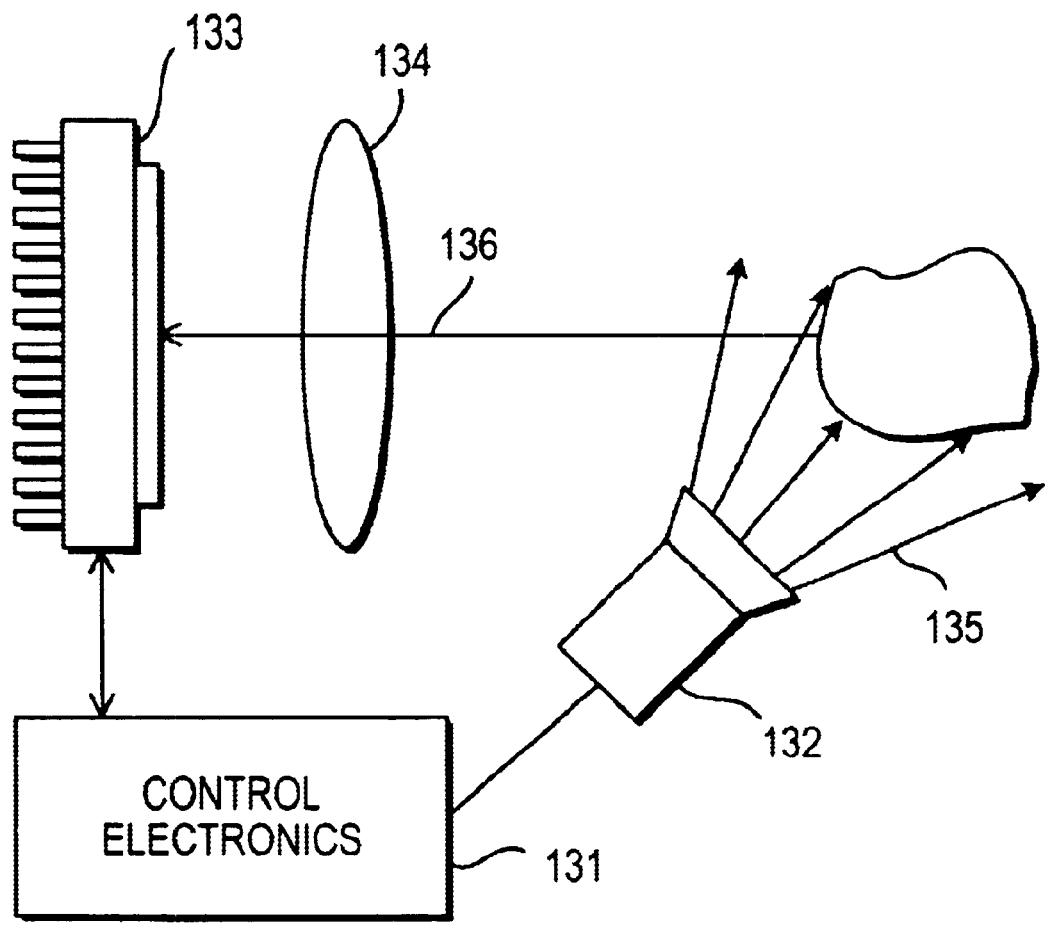
FIG. 13 shows a colorimetric imaging system in accordance with the present invention, utilizing a spectral illuminator, detector, and control electronics.

FIG. 13 shows a colorimetric imaging system using such an illuminator, together with a detector and control electronics. The object being photographed is recorded under three sets of known lighting conditions. The spectral balance of the illuminants are proportional to the X, Y, and Z functions (or X', Y, and Z functions), divided by the spectral responsivity of the detector, so that the net system response (illuminator times detector) is a known colorimetric function in each exposure. It is possible to further weight the illumination so as to incorporate the spectral balance of a standard illuminant such as CIE A, daylight, or some other desired value. In that case, the illuminator response setting for acquiring the X colorimetric image is $$F_x(\lambda)=k_x X(\lambda)*I(\lambda)/D(\lambda) \quad [4a]$$

Corresponding equations for Y and Z plane are:

$$F_y(\lambda)=k_y Y(\lambda)*I(\lambda)/D(\lambda) \quad [4b]$$

$$F_z(\lambda)=k_z Z(\lambda)*I(\lambda)/D(\lambda) \quad [4c]$$

The considerations of image acquisition speed discussed above apply to this embodiment as well. The data is analyzed similarly, although the interpretation of the resulting colorimetric image is somewhat different.

In the embodiment utilizing a spectral illuminator, one obtains a quantitative colorimetric image of an object under known lighting conditions. Because the lighting spectrum is controlled, the image may be thought of as recording the properties of the objects in the scene, whose reflected colors may be deduced from the image (if one neglects inter-reflections between objects). In contrast, the embodiments based on switchable filters record the color and brightness of a scene in quantitative colorimetric terms, precisely as a human would perceive it, were they to stand at the camera's position. But since the lighting is not controlled, it is a record of the visual appearance of the scene, with its unknown lighting, and one can make few conclusions about what color the objects would exhibit under controlled lighting such as daylight, CIE A, and so on.

It is not necessary that the spectral illuminator have fine spectral resolution, beyond that necessary to achieve the goal of matching the desired functions $F_x( )$, $F_y( )$, and $F_z( )$. This may enable simplification of construction and reduction of the parts count involved.

It is possible to transform from the XYZ colorimetric image to RGB, in order to be compatible with the widespread use of this standard. The XYZ values at a given pixel are transformed to RGB by:

$$\begin{matrix} R \\ G \\ B \end{matrix} = \begin{matrix} c_{11} & c_{12} & c_{13} \\ c_{21} & c_{22} & c_{23} \\ c_{31} & c_{32} & c_{33} \end{matrix} * \begin{matrix} X \\ Y \\ Z \end{matrix} \quad [5]$$

where the matrix $c_{ij}$ is simply the inverse of the chromaticity matrix of the RGB primaries:

$$C = 1/P = 1/ \begin{matrix} p_{1x} & p_{2x} & p_{3x} \\ p_{1y} & p_{2y} & p_{3y} \\ p_{1z} & p_{2z} & p_{3z} \end{matrix} \quad [6]$$

Here $p_{1x}$ indicates the x chromaticity value of the first primary (R), $p_{2x}$ indicates the x chromaticity value of the second primary (G), $p_{3x}$ indicates the x chromaticity value of the third primary (B); the other terms are analogous. Put another way, each column in the P matrix is the chromaticity vector of the corresponding RGB primary.

Since the operation is a linear algebraic transformation with well-specified primaries, one may transform into RGB space and back without loss or color shift. This is in marked contrast with present camera systems, that have ill-defined spectra for acquisition, and hence cannot be related to any quantitative color description. The transformation back is made by means of the chromaticity matrix:

$$\begin{matrix} X \\ Y \\ Z \end{matrix} = \begin{matrix} p_{1x} & p_{2x} & p_{3x} \\ p_{1y} & p_{2y} & p_{3y} \\ p_{1z} & p_{2z} & p_{3z} \end{matrix} * \begin{matrix} R \\ G \\ B \end{matrix} \quad [7]$$

It follows from linear algebra that since $C=P^{-1}$, then $CP=PC=I(3)$, and $$XYZ=P(RGB)=P(C(XYZ))=(PC)(XYZ)=XYZ \quad [8a]$$

$$RGB=C(XYZ)=C(P(RGB))=(CP)(RGB)=RGB \quad [8b]$$

Figure 14A:
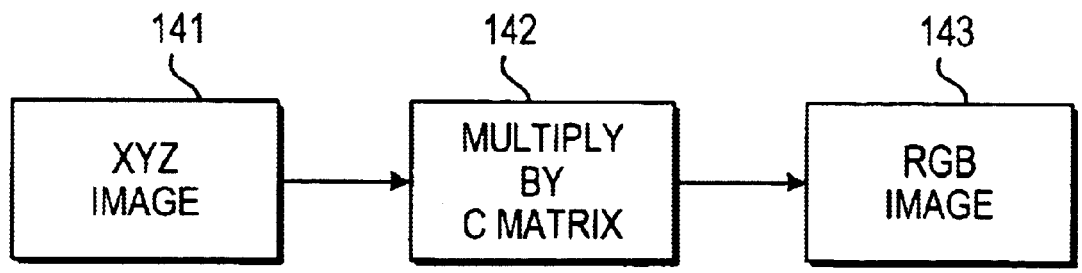
FIG. 14a shows a diagram of the conversion of an XYZ colorimetric image into conventional RGB space while preserving quantitative color information.
Figure 14B:
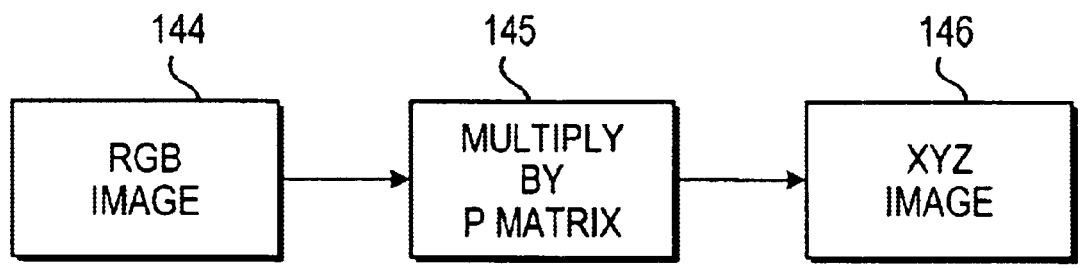
FIG. 14b shows the conversion of a RGB image thus obtained, back to XYZ colorimetric space.

This is simply the mathematical demonstration that the conversion between XYZ and RGB spaces may be performed in either directions, reversibly, without any loss of information or any color shift. The process is diagrammed in FIGS. 14a (XYZ to RGB) and 14b (RGB to XYZ).

It may be desirable to store, transmit, and manipulate images in colorimetric spaces other than XYZ. One that is of particular utility is the L*a*b space, since it is designed to achieve equal measure of perceptual color change for equal numerical shifts in L, a, or b. This makes it an efficient form to store information, since the number of distinct numerical levels available in a digital storage format (such as 256 levels for an 8-bit storage) are equally distinct in perceptual terms. Thus, it does not favor either light or dark, nor one type of hue over another, in the allocation of available descriptions.

The L*a*b is a nonlinear conversion, defined as:

$$L^*=116(Y/Y_W)^{1/3}-16 \quad [9a]$$

$$a^*=500[(X/X_W)^{1/3}-(Y/Y_w)^{1/3}] \quad [9b]$$

$$b^*=200[(Y/Y_w)^{1/3}-(Z/Z_w)^{1/3}] \quad [9c]$$

where $X_w$, $Y_w$, and $Z_w$ are the X,Y, and Z values of a white object when viewed with the scene illumination. For filter-based systems, the white values can reasonably be imputed from a measurement of the X,Y, and Z values of the ambient illumination, using a sensor that detects this, as described above. For illuminator-based systems, the values for $X_w$, $Y_w$, and $Z_w$ are known from the properties of the illuminator.

Figure 15:
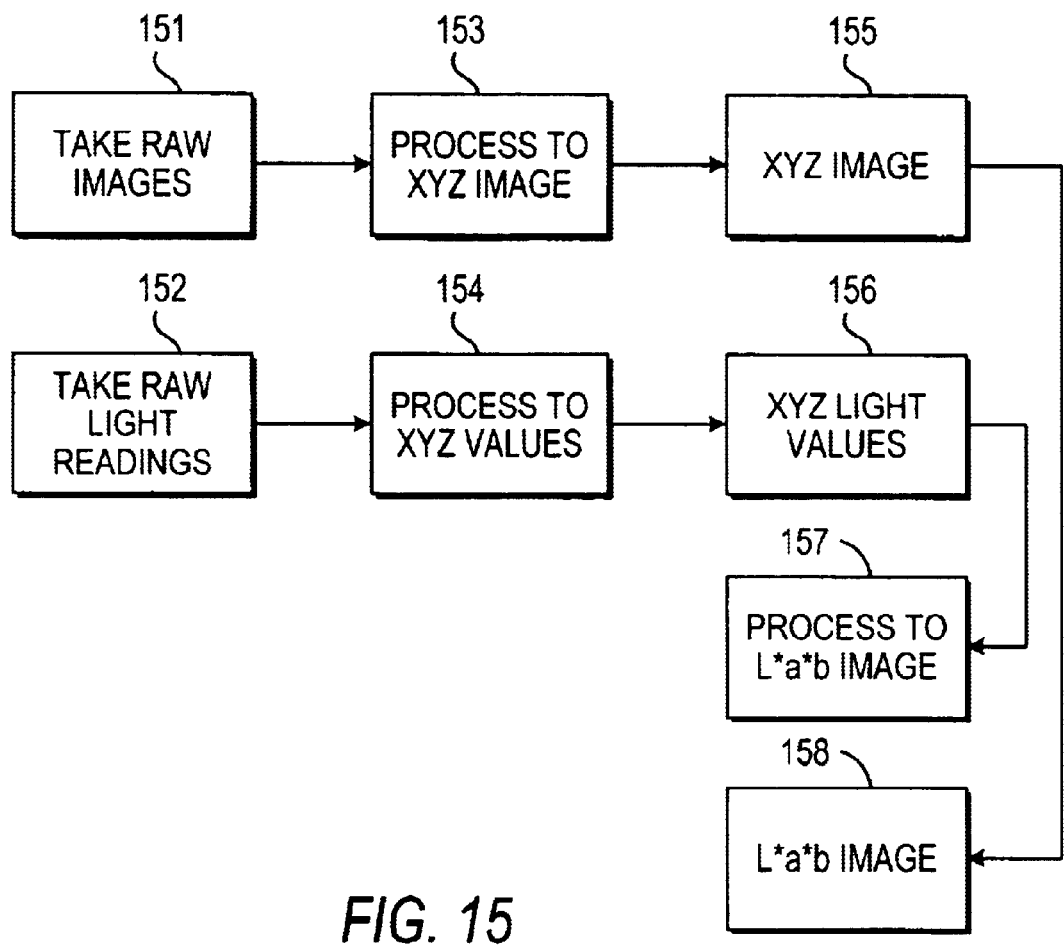
FIG. 15 shows a block diagram of a digital camera system for obtaining images in L*a*b colorimetric space.

A block-diagram of the image-acquisition process and conversion to L*a*b space is shown in FIG. 15. The conversion from XYZ to L*a*b may be achieved using circuitry that is incorporated on the detector chip itself, if CMOS circuitry is employed. Alternatively, it may be performed in software, either by direct calculation or by look-up tables, as will be recognized by those skilled in the art of imaging systems and computation. In either case, it requires knowledge of the color.

Use of the L*a*b space to describe images has not been practical to date, since the images are not obtained in colorimetric terms. While it is sometimes used to describe images that were obtained as RGB images, via a scanner or camera, there is no assurance that the range of colors and brightnesses were in the image have been accurately described. This is remedied by the present invention.

The invention may be used to produce images of conventional photographic scenes, and indeed this is a primary application for it. However, it may also be used to produce images of printed or displayed images, for the purpose of providing a quantitative measure of the colors as reproduced by printing, or as displayed on a computer screen and the like. In the case where a luminous screen is to be measured, the invention cannot be an embodiment based on controlled illumination, but must be an embodiment based on filtration.

It can be readily seen that a measurement of the XYZ values (or other colorimetric index) of a printed or displayed image will be limited by the gamut and brightness range of the output medium. That is, there are certain pure colors which lie outside the printable (or displayable) range; these are sometimes spoken of as being outside the gamut of the device. But colors within the gamut may be displayed and their values corrected to within the measurement accuracy of the invention, by comparing the actual displayed color and brightness against the value produced when the image was acquired. Although the image may be presented in RGB space (or some other space), the XYZ values corresponding to the RGB values can be calculated without error by means of the matrix methods above and others which are known in the science of colorimetry.

While various particular embodiments have been shown, it is not the intention that the invention be limited by the specific embodiments, as alternative elements, substitutions, and the like may be employed in ways that will be apparent to those skilled in the art of optics, polarized light, and liquid crystal devices.

All references cited herein are incorporated by reference.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An imaging system that obtains the colorimetric value of a plurality of points in a scene when the scene is lit by a source of illumination, comprising:
    an imaging detector,
    imaging optics that receive light from the scene and direct it to the detector,
    a tunable filter that is disposed at one of a position between the source of illumination and the scene, a position between the scene and the imaging optics, and a position between the imaging optics and the detector, said tunable filter responsive to applied electrical signals that filters the spectrum of light passing therethrough, and
    a control circuit for acquiring and storing a plurality of images from the detector while the tunable filter expresses a plurality of predetermined filter response functions in response to applied electrical signals, and determining the colorimetric values from the stored images,
    wherein each of the filter response functions has substantial transmission at a plurality of wavelengths.

2. The imaging system according to claim 1, wherein the detector and at least one of the filter response functions achieve overall spectral response that is approximately proportional to one of the three colorimetric functions, X, Y, and Z.

3. The imaging system according to claim 1, wherein the detector and at least two of the filter response functions achieve overall spectral responses that are approximately proportional to two of the colorimetric functions, X, Y, and Z.

4. The imaging system according to claim 1, wherein one of the filter response functions is transmissive at all wavelengths in the visible range.

5. The imaging system according to claim 1, wherein the tunable filter comprises at least one liquid crystal cell.

6. The imaging system according to claim 1, wherein the tunable filter comprises:
    a first optical retarder network having an optical axis and a first action on the polarization state of incident light passing through the first network;
    a second optical retarder network disposed in optical series with said first retarder network for receiving light that has passed through the first network and having an optical axis and a second action on the polarization state of the received light passing through the second network;
    a switch operable for varying the filter response to the incident light passing through the first and second networks between a first operating state in which the filter transmits without significant alteration to the polarization state substantially all of the incident light within a predetermined range of wavelengths and a second operating state in which the filter produces a predetermined spectral variation of the incident light in its passing through the filter by changing one of an angular orientation of the polarization state of the received light relative to an angular orientation of the second network and the polarization state of the light received by the second network, as between said first operating state and said second operating state.

7. The imaging system according to claim 1 wherein the colorimetric value is calculated from the plurality of images using linear arithmetic operations.

8. The imaging system according to claim 7 wherein the colorimetric value is determined in terms of the X, Y, and Z values.

9. The imaging system according to claim 7 wherein the colorimetric value is determined in terms of the L, a, b values.

10. The imaging system according to claim 1 further comprising a non-tunable filter element.

11. The imaging system according to claim 1 wherein the detector contains circuitry for storing a plurality of images for subsequent readout.

12. The imaging system according to claim 11 wherein the detector can acquire three images in three milliseconds or less.

13. The imaging system according to claim 1 wherein two of the overall spectral response functions are approximately proportional to the Y and Z colorimetric functions, and a third overall response function approximates the X colorimetric function for wavelengths greater than 500 nm.

14. The imaging system according to claim 13 wherein a linear combination of the third overall response function and the overall response function approximating the Z colorimetric function is approximately proportional to the X colorimetric function.

15. An imaging system that accurately obtains the color of a plurality of points in a scene when the scene is lit by a source of illumination, comprising:

an imaging detector, imaging optics that receive light from the scene and direct it to the detector, a tunable filter that is disposed at one of a position between the source of illumination and the scene, a position between the scene and the imaging optics, and a position between the imaging optics and the detector, said tunable filter responsive to applied electrical signals that filters the spectrum of light passing therethrough, a control circuit for acquiring and storing a plurality of images from the detector while the filter expresses a plurality of predetermined filter response functions in response to applied electrical signals, and calculating the color at the plurality of points in the scene from the stored images, expressed in terms of a predefined color space, wherein the filter response functions have substantial transmission at a plurality of wavelengths; the color space comprises linear combinations of the colorimetric functions X, Y, and Z; and the detector and at least one of the filter response functions achieve overall spectral responses that are approximately proportional to one of the three colorimetric functions, X, Y, and Z.

16. The method of obtaining the colorimetric value of a plurality of points in a scene when the scene is lit by a source of illumination, comprising the steps of:

receiving light from the scene and directing the received light to an imaging detector by use of imaging optics, filtering the light from the source of illumination or from the scene by use of a tunable filter capable of expressing a plurality of spectral response functions in response to applied electrical signals, wherein said tunable filter is disposed at one of a position between the source of illumination and the scene, a position between the scene and the imaging optics, and a position between the imaging optics and the detector, exposing the detector to light filtered by the tunable filter to obtain a plurality of images while the filter expresses a plurality of predetermined filter response functions in response to applied electrical signals, wherein each of the filter response functions has substantial transmission at a plurality of wavelengths, and determining the colorimetric value of the plurality of points in the scene from the plurality of images.

17. The method according to claim 16 wherein the colorimetric value is calculated as the tristimulus values X, Y, and Z.

18. The method according to claim 16 wherein the colorimetric value is calculated in terms of one of the Luv and the Lab colorimetric systems.

* * * * *